United States Patent [19]

Drone et al.

[11] 4,267,545
[45] May 12, 1981

[54] HYDRAULIC VEHICLE PERFORMANCE SENSOR AND SHIFT POINT INDICATOR

[75] Inventors: Gary A. Drone, Springfield, Ill.; Harvey W. Rockwell, Port Charlotte, Fla.

[73] Assignee: Fiat-Allis Construction Machinery, Inc., Deerfield, Ill.

[21] Appl. No.: 67,623

[22] Filed: Aug. 17, 1979

[51] Int. Cl.³ .................... B60K 23/00; G08B 21/00
[52] U.S. Cl. .................... 340/52 R; 74/856; 307/10 R; 340/52 D; 340/60
[58] Field of Search .......... 340/52 R, 52 D, 52 F, 340/60; 307/10 R; 74/844, 856, 861, DIG. 7

[56] References Cited

U.S. PATENT DOCUMENTS

| | | | |
|---|---|---|---|
| 2,711,525 | 6/1955 | Kelley | 340/52 R |
| 2,751,580 | 6/1956 | Stump | 340/52 R X |
| 2,924,111 | 2/1960 | Backus et al. | 74/861 X |
| 3,296,607 | 1/1967 | Pasinski | 340/52 R X |
| 3,420,328 | 1/1969 | Johnson et al. | 74/844 X |
| 4,025,897 | 5/1977 | Kisuna et al. | 340/52 R |
| 4,174,766 | 11/1979 | Kalogerson | 340/52 D |

Primary Examiner—John W. Caldwell, Sr.
Assistant Examiner—Joseph E. Nowicki
Attorney, Agent, or Firm—August E. Roehrig, Jr.; Robert A. Brown

[57] ABSTRACT

A vehicle performance sensor that monitors the operation of a vehicle and provides a shift point indicator to inform the vehicle operator when to shift the transmission. When the rotational output from the vehicle torque converter is not within the desired operating range of the transmission gearing, a signal will be generated to notify the operator by a visual indication that the transmission should be shifted and which gear should be selected.

13 Claims, 7 Drawing Figures

HYDRAULIC VEHICLE PERFORMANCE SENSOR AND SHIFT POINT INDICATOR

BACKGROUND OF THE INVENTION

This invention relates in general to vehicle performance sensors and, in particular, to a hydraulic sensor system having a shift point indicator which indicates when to shift the vehicle transmission.

More specifically, but without restriction to the particular use which is shown and described, this invention relates to a hydraulic vehicle performance sensor system that monitors the output of a vehicle torque converter and directs the vehicle operator when and how to shift the vehicle transmission so that optimum performance will be maintained.

As is well known, self-propelled vehicles utilize a transmission to couple the output of an engine to the driving wheels. Some such vehicles, such as crawler tractors, utilize a plurality of gearing ranges to effect the speed and driving force generated by the vehicle. Since each gear range is most efficient to operate at different pre-selected ranges of vehicle operation, the selection of the particular gear range or gearing that will operate the vehicle most efficiently, is best determined in relationship to the output from the vehicle torque converter.

With vehicles such as construction machinery or earth moving equipment, the vehicle transmissions generally are shifted by the machine operator. During operation, the vehicle will operate efficiently while in a given gear if the output of the torque converter is within the range pre-selected for that gear. However, when the output either increases or decreases so that it is no longer within the pre-selected range for that gear, the transmission should be shifted accordingly to maintain the performance of the vehicle at an optimum level.

Since the transmission is manually shifted by the machine operator, in the past operator experience determined when to shift gears with the result that there was no assurance that the gears of the vehicle would be shifted at the proper time. Due to the high level of noise present at the sites where such vehicles are usually operated, the operator in relying on engine sound and "feel," had no accurate means of knowing exactly when to shift gears in order to maintain the optimum performance of the vehicle.

The present invention, therefore, provides a hydraulic system which monitors the output from a vehicle torque converter, and in response to the output speed changes develops a hydraulic pressure that activates or de-activates a plurality of switching devices. These switching devices generate signals to instruct the operator when to shift gears and into which gear the vehicle transmission should be shifted. A panel display is provided to visually indicate this information to the operator, so that he will know exactly when to shift the transmission regardless of the noise on the site. Efficient operation of the vehicle in this manner will both increase the life of the vehicle and reduce the downtime required for vehicle repair.

SUMMARY OF THE INVENTION

It is, therefore, an object of this invention to maintain optimum vehicle performance.

Another object of this invention is to monitor vehicle performance to determine when to shift the vehicle transmission.

A further object of this invention is to facilitate shifting the vehicle transmission in response to changes in the output of the vehicle torque converter.

Still another object of this invention is to instruct a vehicle operator when to shift the vehicle transmission.

These and other objects are attained in accordance with the present invention wherein there is provided a vehicle performance sensor that monitors the output from a vehicle torque converter and provides a shift point indicator to inform the vehicle operator when to shift the vehicle transmission. When the output from the torque converter is not within the desired operating range of the transmission gearing, a signal will be generated to notify the operator by a visual indication that the transmission should be shifted and which gear should be selected.

DESCRIPTION OF THE DRAWINGS

Further objects of the invention together with additional features contributing thereto and advantages accruing therefrom will be apparent from the following description of a preferred embodiment of the invention which is shown in the accompanying drawings with like reference numerals indicating corresponding parts throughout, wherein.

DESCRIPTION OF A PREFERRED EMBODIMENT

For convenience of illustration, the vehicle performance monitoring system of the present invention is disclosed in use with a vehicle transmission having three (3) gear ranges. The recommended range of operation for the first gear is 0-1500 revolutions per minute (RPM); for the second gear the range is 1500-1800 RPM; and for third gear the range is 1500-2100 RPM. However, it is to be understood that the invention is not intended to be so limited, but is suitable for use with vehicles which have transmissions having additional and/or other gear ranges.

Referring now to FIGS. 1-7, there is illustrated a series of hydraulic schematic drawings of the various operating stages of the vehicle performance sensor and shift point indicator at various ranges of vehicle torque converter output. A hydraulic pump 20 has its fluid output coupled to be directly proportional to the output 12 of a hydraulic torque converter 11. A transmission 13 is connected to a vehicle engine 10 and contains the physical gearing which is not shown.

Three normally open gear-clutch, pressure-sensitive switches 100, 200 and 300 are coupled in electrical circuits with a source of power, such as a battery 50, and a plurality of hydraulic pump pressure activated switching devices 101, 102, 201, 202, 203, 301 and 302. Each of the pressure-sensitive switches 100, 200 and 300 is responsive to operation of the vehicle transmission hydraulic clutch gear ratio in first, second and third gear, respectively, and can be of a type such as disclosed in U.S. Pat. No. 3,348,643. Each of the normally open switches 100, 200 and 300 will close when the vehicle transmission is operating in first, second or third gear, respectively.

The hydraulic pump pressure actuated switching devices 101 and 102 are associated with gear switch 100; pressure activated switching devices 201, 202 and 203 are associated with gear switch 200; and pressure activated switching devices 301 and 302 are associated with gear pressure switch 300. When the vehicle is being operated in first, second or third gear, the appropriate gear switch 100, 200 or 300, respectively, will be closed. The hydraulic pump pressure actuated switching devices 101, 102, 201-203, 301 and 302 will function to couple an electrical signal to a visual panel display 30, which will instruct the vehicle operator with regard to the operation and shifting of the transmission gears. The panel display 30 has four separate visual indicators 31, 32, 33 and 34. Indicator 31 is energized when the vehicle is operating within the recommended range of performance for the particular transmission gear in which it is then operating. Indicator 32 is energized when the vehicle transmission should be shifted into first gear. Indicator 33 is energized when the vehicle transmission should be shifted into second gear, and indicator 34 is energized when the vehicle transmission should be shifted into third gear.

As discussed previously, the hydraulic pump 20 provides hydraulic pressure in response to the output from the torque converter 11. The pump output is coupled through a conduit 21 into fluid communication with the switching devices 101, 102, 201-203, 301 and 302 to control the operations of the switching devices. The hydraulic pump output conduit 21 provides hydraulic fluid at a pressure directly proportional to the output of the torque converter 11. The switching devices 101, 102, 201-203, 301 and 302 will thereby engage and disengage in response to changes in hydraulic pressure which is in response to different output speed from the torque converter. To prevent the fluid pressure from becoming too great such that these switches might be damaged, a variable resistance pressure control orifice 22 and a spring-biased pressure relief valve 23 are coupled in conduit 21 between the output from pump 20 and the pressure-sensitive switches. These valves provide a suitable operative pressure for actuating the switches, but will dump hydraulic fluid to the sump 24 if the pressure becomes too great.

Figure 1:
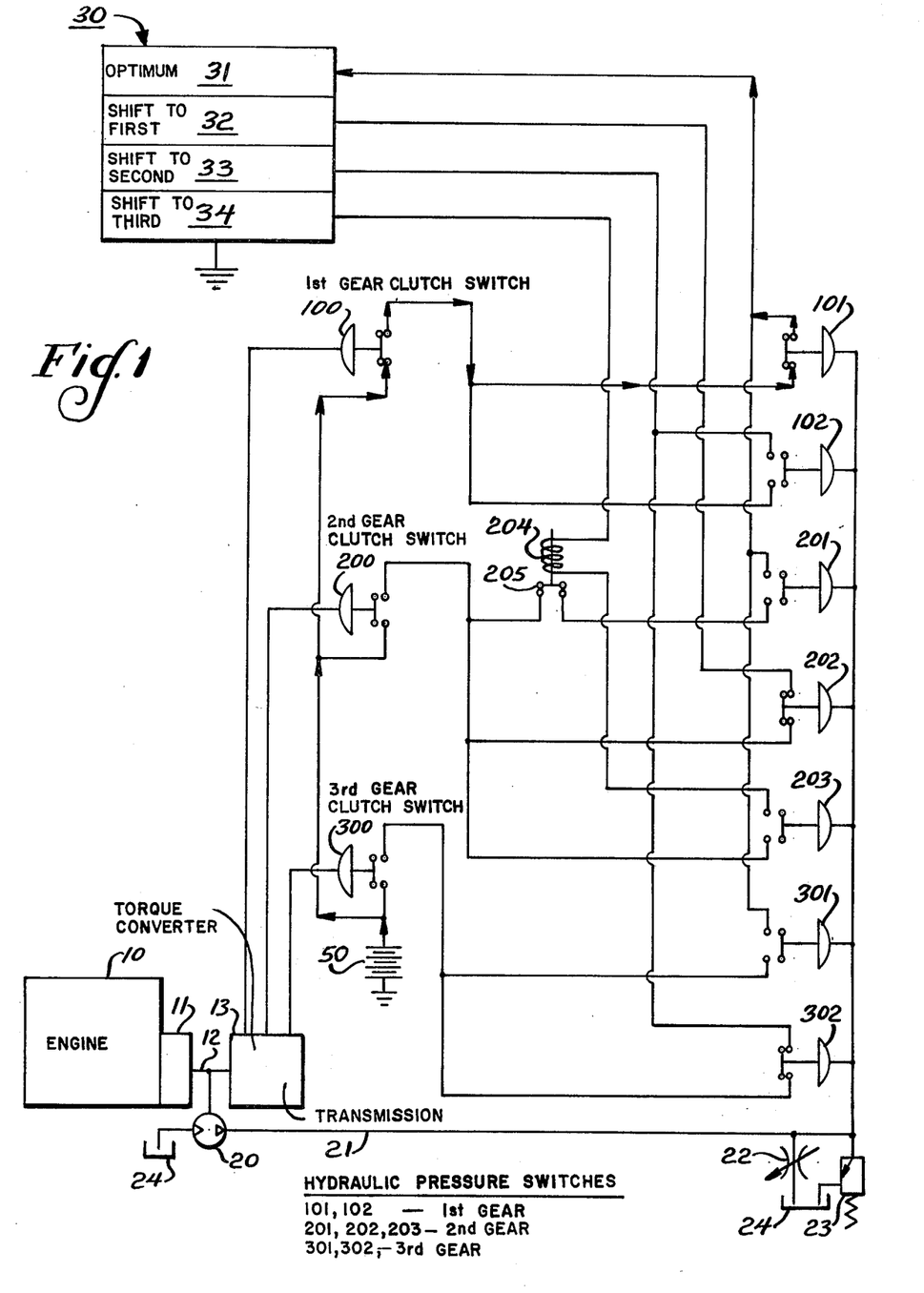
FIGS. 1-7 are hydraulic schematics to illustrate the various control functions of the monitoring system to effect transmission shifting over different ranges of torque converter output.

When the vehicle is initially started, the transmission is shifted into first gear for operation. Referring to FIG. 1, when the vehicle is operating in first gear, gear pressure switch 100 will be closed. As long as the rotational speed of the torque converter is within the range of 0 to 1500 RPM, the recommended performance range for first gear, current will flow from the battery 50 through clutch gear pressure switch 100 and normally closed switching device 101 to illuminate indicator 31 of the panel display 30. The indicator will be energized and inform the vehicle operator that the vehicle is operating within the recommended performance range for the gear selected, first gear.

Figure 2:
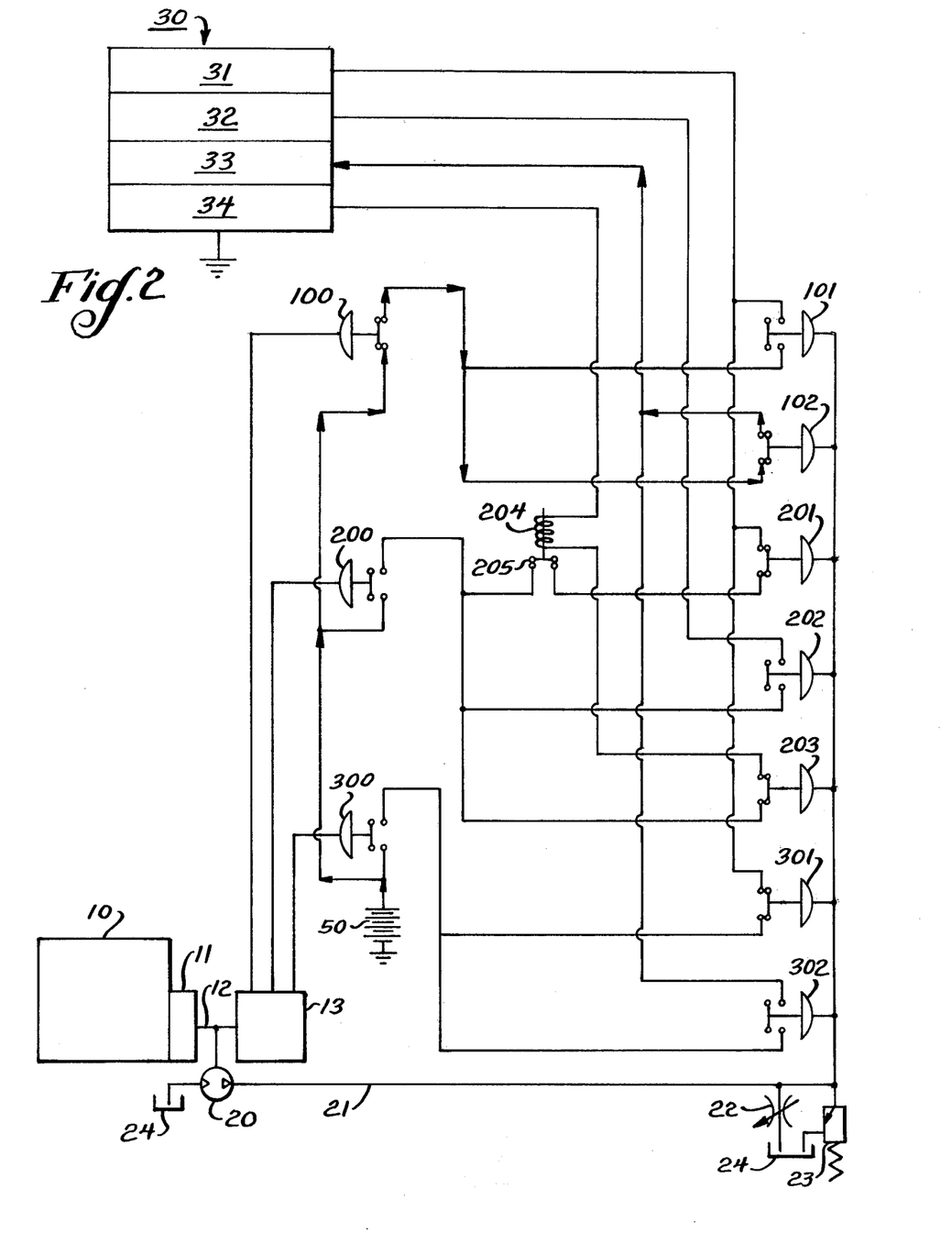
Figure 3:
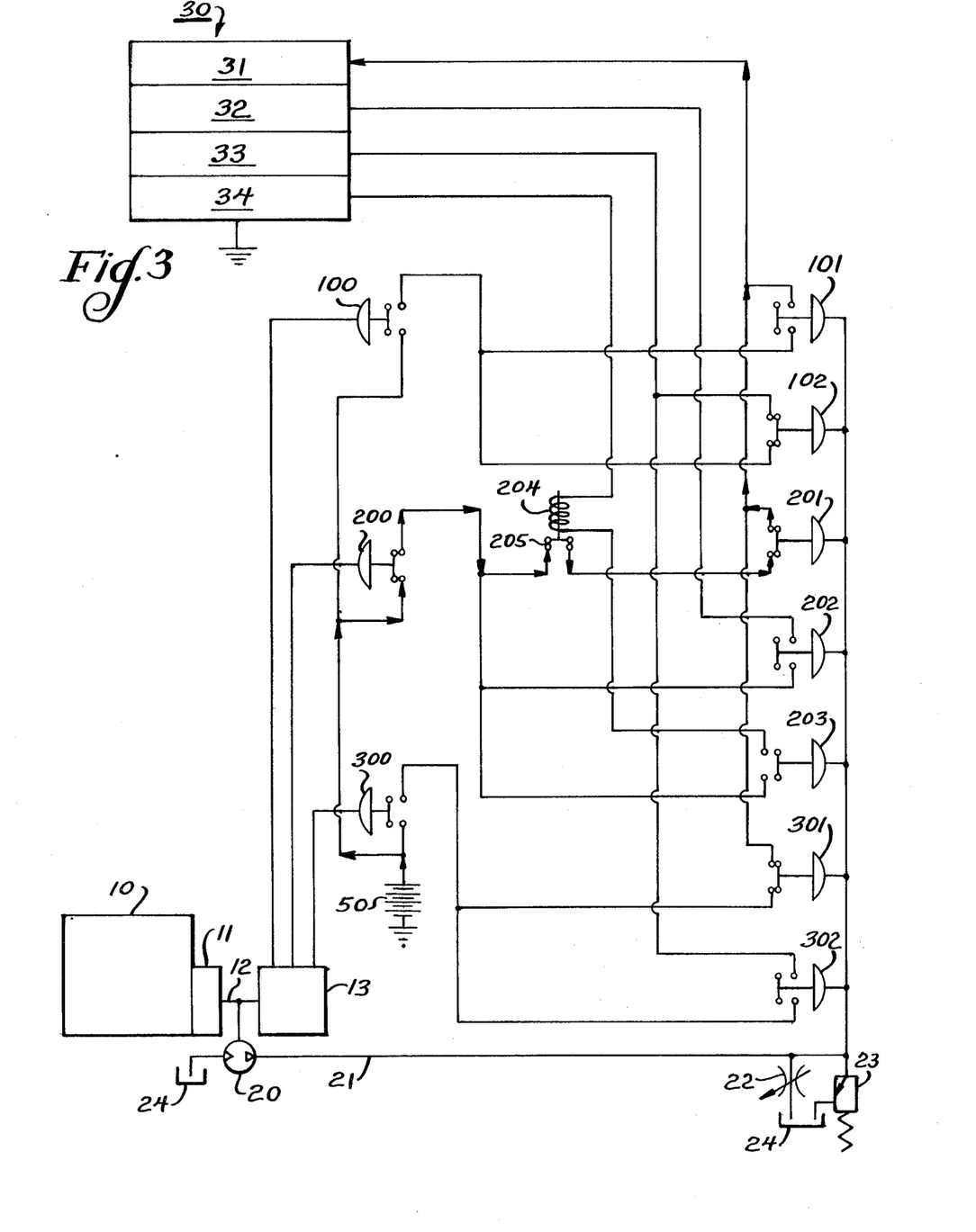

However, when the output speed of the torque converter 11 is equal to or exceeds 1500 RPM, normally closed hydraulic pressure-sensitive switching device 101 will open and normally open switching device 102 will close, as shown in FIG. 2. Current will continue to flow from the battery 50 through the gear switch 100, but will then be coupled through the pressure sensitive switching device 102 to illuminate indicator 33 of the panel display 30. This will provide a visual instruction to the operator of the vehicle to shift the vehicle transmission to second gear.

When the vehicle operator shifts the transmission to second gear (FIG. 3), gear switch 100 will open and gear switch 200 will close. As long as the operating speed of the torque converter is maintained in the range of 1500-1800 RPM, current will flow from the battery 50 through gear switch 200, through a normally closed solenoid switch contact 205 (which is opened by energizing the coil of a solenoid 204) and through normally open switching device 201 (which is closed when the operating speed of the torque converter 11 attains 1500 RPM) to indicator 31. The panel display 30 will thereby indicate to the vehicle operator that the vehicle is operating within the recommended performance range for the gear selected, second gear.

Figure 4:
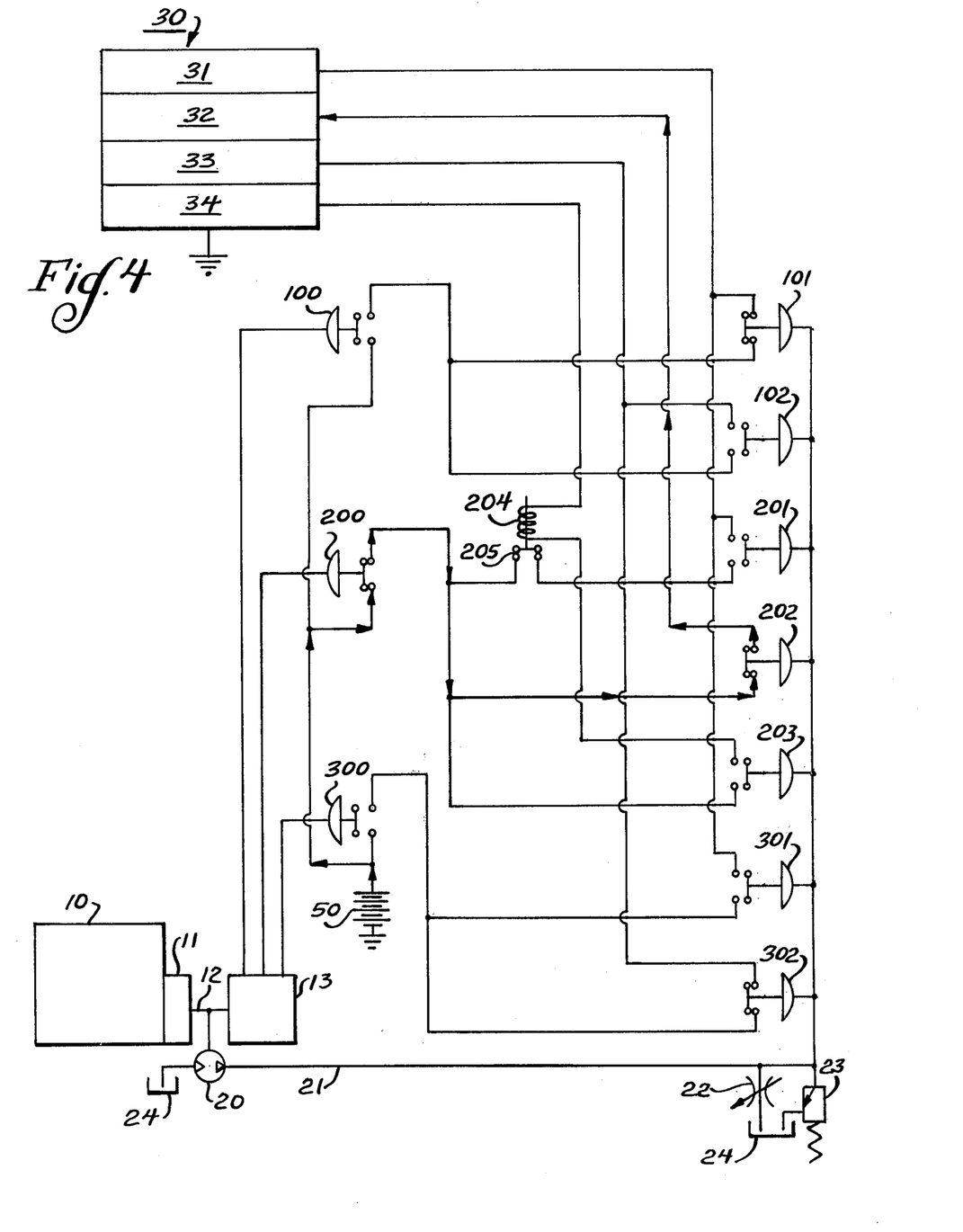

Referring now to FIG. 4, when the vehicle is being operated in second gear, and the output speed of the torque converter 11 drops below 1500 RPM, switching device 201 (which was closed at 1500 RPM) will return to its normally open state. Normally closed switching device 202 (which opened at 1500 RPM) will now return to its normally closed position thereby allowing current to flow from the battery 50, through gear switch 200, and through switching device 202 to illuminate indicator 32 of the panel display 30. This visual indication will instruct the operator of the vehicle to shift the transmission from second gear to first gear.

Figure 5:
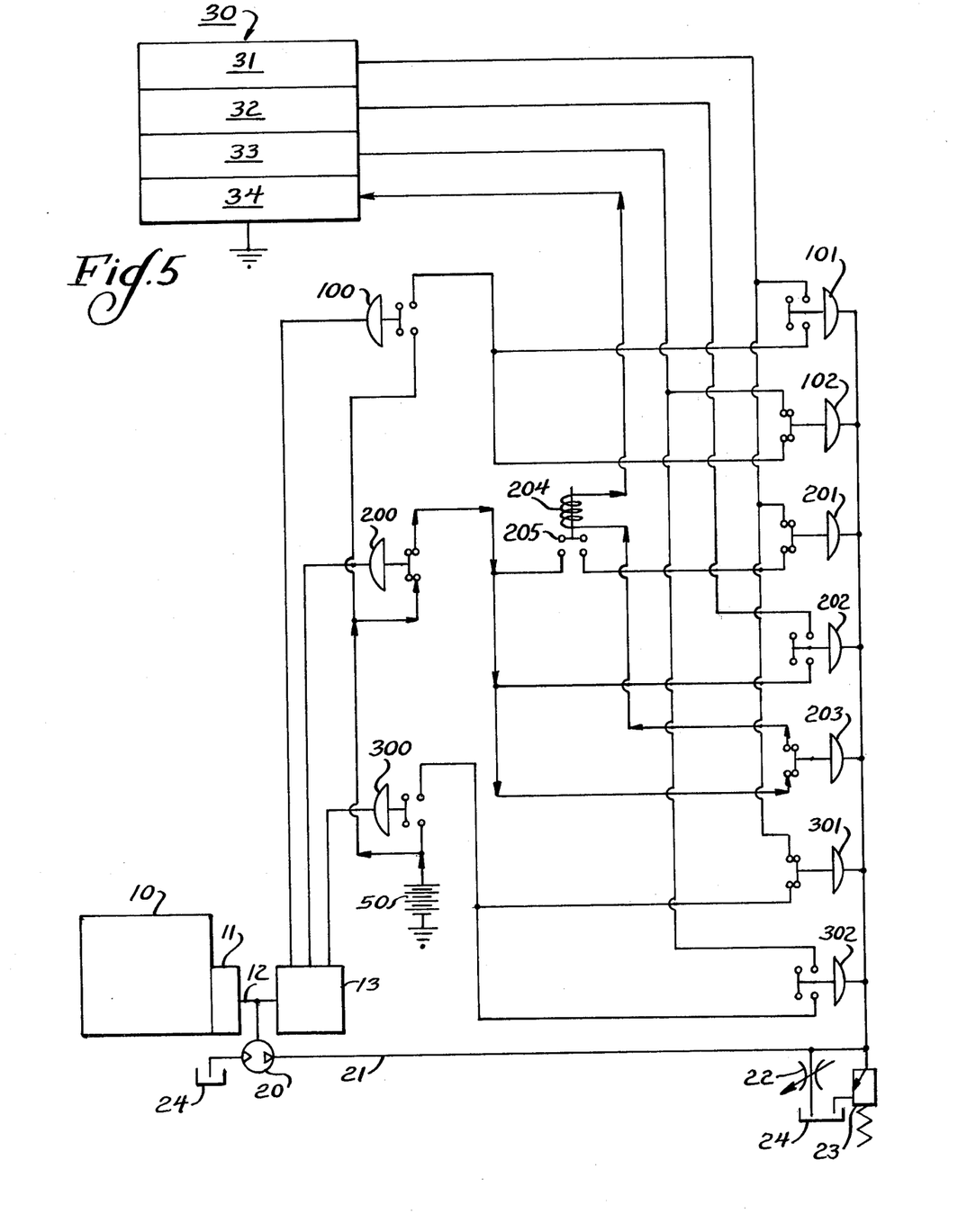

As shown in FIG. 5, in the event the vehicle torque converter speed exceeds 1800 RPM while the transmission is in second gear, normally open switching device 203, which closes when the speed of the torque converter 11 exceeds 1800 RPM, will close. Normally open switching device 202, which opened when the torque converter output attained a speed of 1500 RPM, will remain open and normally open switching device 201 (which closed when the torque converter 11 attained a speed of 1500 RPM) will remain closed. To insure current flow through switching device 203, and not switching device 201, the solenoid 204 is inserted in the current flow path associated with switching device 203. When current flows through the coil of solenoid 204, it will be energized to open the normally closed solenoid switch contacts 205, thereby blocking current flow through switching device 201. Current thereby flows from the battery 50, through gear switch 200, switching device 203, and the coil of solenoid 204 to indicator 34 of the panel display 30. The visual indication shown on the panel display 30 will instruct the vehicle operator to shift the transmission to third gear.

Figure 6:
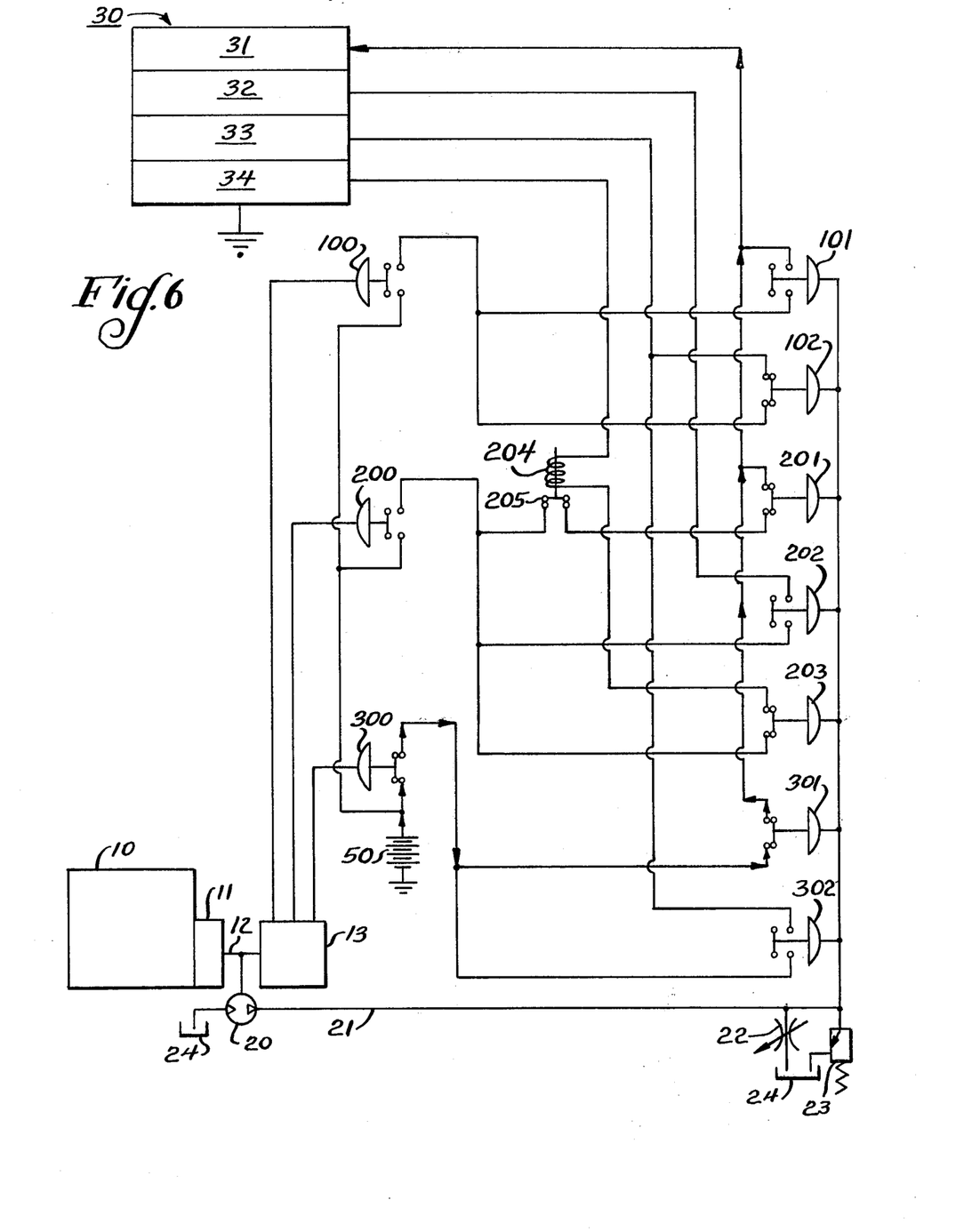

Turning now to FIG. 6, when the vehicle operator shifts the transmission to third gear, gear switch 200 will open and gear switch 300 will close. As long as the rotating speed of the torque converter is in the range of 1500 to 2100 RPM, current will flow from battery 50 through gear switch 300, through normally open switching device 301 (which closed when the torque converter exceeded 1500 RPM), to indicator 31 of the panel display 30. This will instruct the vehicle operator that the vehicle is operating within the recommended range for the gear selected, third gear.

Figure 7:
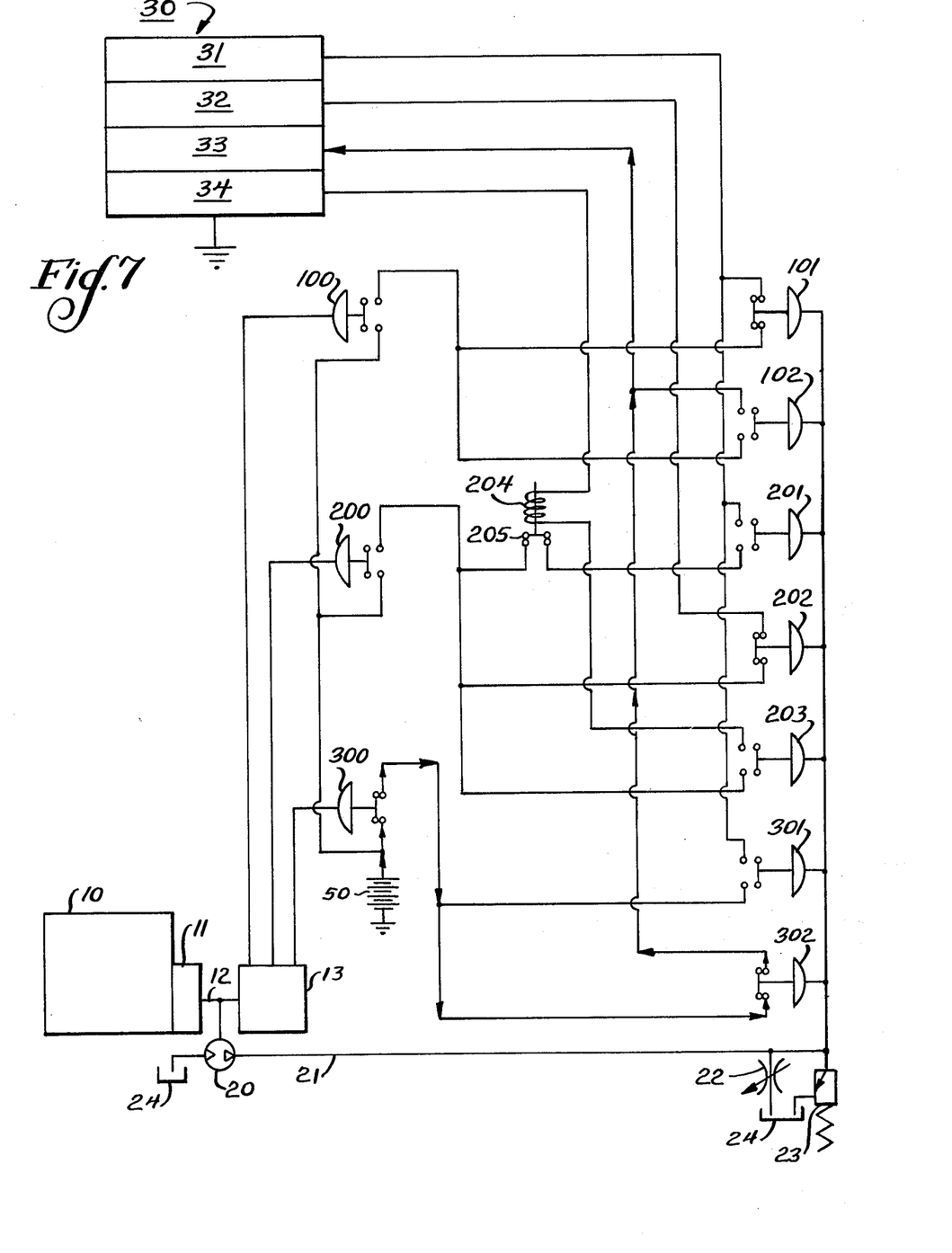

As shown in FIG. 7, in the event that the torque converter output decreases below 1500 RPM, normally open pressure-sensitive switching device 301 (which was closed during operation of the torque converter over 1500 RPM), will now return to its normally open state. Normally closed switching device 302 (which was open when the torque converter was operating at a speed greater than 1500 RPM) will return to its normally closed state. Current will thus flow from the battery 50, through gear switch 300, and through the pressure-sensitive switching device 302 to indicator 33 of the panel display 30. This will provide visual instruction to the vehicle operator to shift the transmission to second gear.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A vehicle performance monitoring system for instructing a vehicle operator when and into which gear a vehicle transmission, having a plurality of gear ranges, should be shifted in order to maintain the vehicle operating within a desired range of performance for each gear range in which the transmission is operated, comprising
   a first plurality of switching means actuated upon placing a vehicle transmission in a gear range for enabling an electrical circuit to be established for each gear range in which the vehicle transmission is operated,
   each one of said first plurality of switching means being mutually exclusively actuated upon the shifting of the vehicle transmission into one of the gear ranges in which the transmission is operated,
   a source of electrical power adapted to be mutually exclusively coupled through each one of said first plurality of switching means when the vehicle transmission is shifted into each one of the gear ranges in which the transmission is operated,
   indicator means actuable to convey information for informing a vehicle operator when and into which gear range the vehicle transmission should be shifted,
   an electrical circuit coupled between said first plurality of switching means and said indicator means for actuating said indicator means in response to the coupling of electrical power thereto,
   monitoring means operatively coupled to a vehicle torque converter for providing a source of pressurized hydraulic fluid at a pressure determined by the rotational speed of the torque converter,
   a second plurality of switching means operatively connected in fluid communication to said source of hydraulic fluid for actuation thereby in response to the hydraulic pressure coupled thereto,
   said second plurality of switching means being interposed in said electrical circuit between said first plurality of switching means and said indicator means for coupling said source of electrical power to said indicator means in response to the actuation of said second plurality of switching means to inform the vehicle operator when and into which gear the vehicle transmission should be shifted.

2. The vehicle performance monitoring system of claim 1 wherein at least two separate ones of said second plurality of switching means are operatively coupled to each one of said first plurality of switching means.

3. The vehicle performance system of claim 2 wherein said two separate ones of said second plurality of switching means comprises at least one normally open switching means and at least one normally closed switching means, and wherein upon receipt of a predetermined hydraulic pressure coupled thereto said open switching means will be closed and said closed switching means will be opened.

4. The vehicle performance monitoring system of claim 1 wherein said monitoring means includes a hydraulic pump operatively connected to the output shaft of the vehicle torque converter to discharge hydraulic fluid at a pressure responsive to the rotational speed thereof,
   fluid conduit means in fluid communication between said hydraulic pump and said second plurality of switching means, and
   hydraulic fluid pressure relief means interposed in said fluid conduit means to prevent the fluid pressure coupled to said second plurality of switching means from exceeding a predetermined limit.

5. The vehicle performance monitoring system of claim 1 wherein the gear ranges for the vehicle transmission includes a high gear range, a low gear range and at least one intermediate gear range, and said second plurality of switching means includes at least three second switching means interposed in said electrical circuit for coupling said source of electrical power to said indicator means when the vehicle transmission is in an intermediate gear range, and wherein
   one of said first plurality of switching means actuated upon placing the vehicle transmission in an intermediate gear range is mutually exclusively coupled through one of said at least three second switching means to couple said source of electrical power to said indicator means.

6. The vehicle performance monitoring system of claim 5 wherein at least two of said second plurality of switching means are interposed in said electric circuit for coupling said source of electrical power to said indicator when the transmission is positioned in high gear range, and wherein
   said two of said second plurality of switching means comprise a normally open switch and a normally closed switch, which when actuated are moved to a closed position and opened position, respectively upon actuation by the hydraulic pressure.

7. The vehicle performance monitoring system of claim 5 wherein at least two of said second plurality of switching means are interposed in said electric circuit for coupling said source of electrical power to said indicator when the transmission is positioned in low gear range, and wherein
   said two of said second plurality of switching means comprise a normally open switch and a normally closed switch, which when actuated are moved to a closed position and opened position, respectively upon actuation by the hydraulic pressure.

8. The apparatus of claim 5 further including interrupter means to disable all but one of said at least three second switching means for any given rotational speed of the vehicle torque converter.

9. The vehicle performance monitoring system of claim 8 wherein said interrupter means includes a solenoid switch having a pair of switch contacts interposed in said electric circuit means between said first plurality of switching means actuated upon placing the vehicle transmission in the intermediate gear range and said three second switching means to disable all but one of said three ones of said second switching means in response to the rotational speed of the torque converter in intermediate gear range.

10. The vehicle performance monitoring system of claim 1 wherein said indicator means includes a visual display for instructing the vehicle operator when and into which gear the vehicle transmission should be shifted.

11. The vehicle performance monitoring system of claim 10 wherein said visual display also displays a visual signal when the vehicle transmission is operating within a desired range of performance.

12. The vehicle performance system of claim 1 wherein said second plurality of switching means are actuable upon receipt of a pre-determined pressure from said source of hydraulic pressure.

13. A method of monitoring the performance of a vehicle for instructing a vehicle operator when and into which gear a vehicle transmission, having a plurality of gear ranges should be shifted in order to maintain the vehicle operating within a desired range of performance for each gear range in which the transmission is operated comprising the steps of monitoring the rotational output speed of a vehicle torque converter and producing thereby a hydraulic fluid signal in response to the output speed of the vehicle torque converter, producing an enabling signal from the vehicle transmission for the gear range in which the vehicle transmission is then operating, coupling the hydraulic fluid signal to a plurality of switching devices selectively actuable upon receipt of said hydraulic fluid signal to thereby complete an electrical circuit, and coupling the enabling signal from the vehicle transmission to indicator means actuable to display when and into which gear the vehicle transmission should be shifted, through said plurality of selectively actuable switching devices to complete the electrical circuit for actuating said indicator means in response to the hydraulic fluid signal coupled to said switching devices to inform the vehicle operator when and into which gear the vehicle transmission should be shifted.

* * * * *